United States Patent [19]

Kustka et al.

[11] 4,019,149
[45] Apr. 19, 1977

[54] CORRELATIVE DATA DEMODULATOR

[75] Inventors: George John Kustka, Matawan; Kurt Hugh Mueller, Holmdel, both of N.J.

[73] Assignee: Bell Telephone Laboratories, Incorporated, Murray Hill, N.J.

[22] Filed: Jan. 16, 1976

[21] Appl. No.: 649,716

[52] U.S. Cl. .............................. 329/107; 178/88; 329/104; 325/38 R; 325/321
[51] Int. Cl.[2] .......................................... H03K 9/04
[58] Field of Search ................ 329/104, 107, 103; 325/321, 38 R, 145; 178/88

[56] References Cited

UNITED STATES PATENTS

| 3,729,684 | 4/1973 | Shuda | 329/104 |
| 3,747,003 | 7/1973 | Siglow | 329/104 |
| 3,938,052 | 2/1976 | Glasson | 329/104 |

*Primary Examiner*—John Kominski
*Attorney, Agent, or Firm*—Joseph P. Kearns

[57] ABSTRACT

A demodulator for differentially coherent phase-shift keyed data signals correlates samples taken in consecutive baud intervals. Received digital data signals are hardlimited to preserve zero-crossings only and samples of such hardlimited signals are temporarily stored in a delay structure. Polarity correlations are made between two pairs of samples relatively delayed by a baud interval less 45°, and a baud interval plus 45°, of carrier wave phase. These direct correlations control the counting direction of separate reversible counters. A further indirect correlation is made between the direct correlations and this third correlation is used to inhibit or not the operation of the reversible counters. The count-up, count-down and inhibit pattern constitutes ternary processing of binary data. The resultant counts are decoded at the end of each baud interval by observing whether the net count has been up or down. The counters are reset. The polarity states of the counters are directly registered in a pair of bistable circuits as decoded data bits without regard to count magnitude and without further logic operations.

8 Claims, 3 Drawing Figures

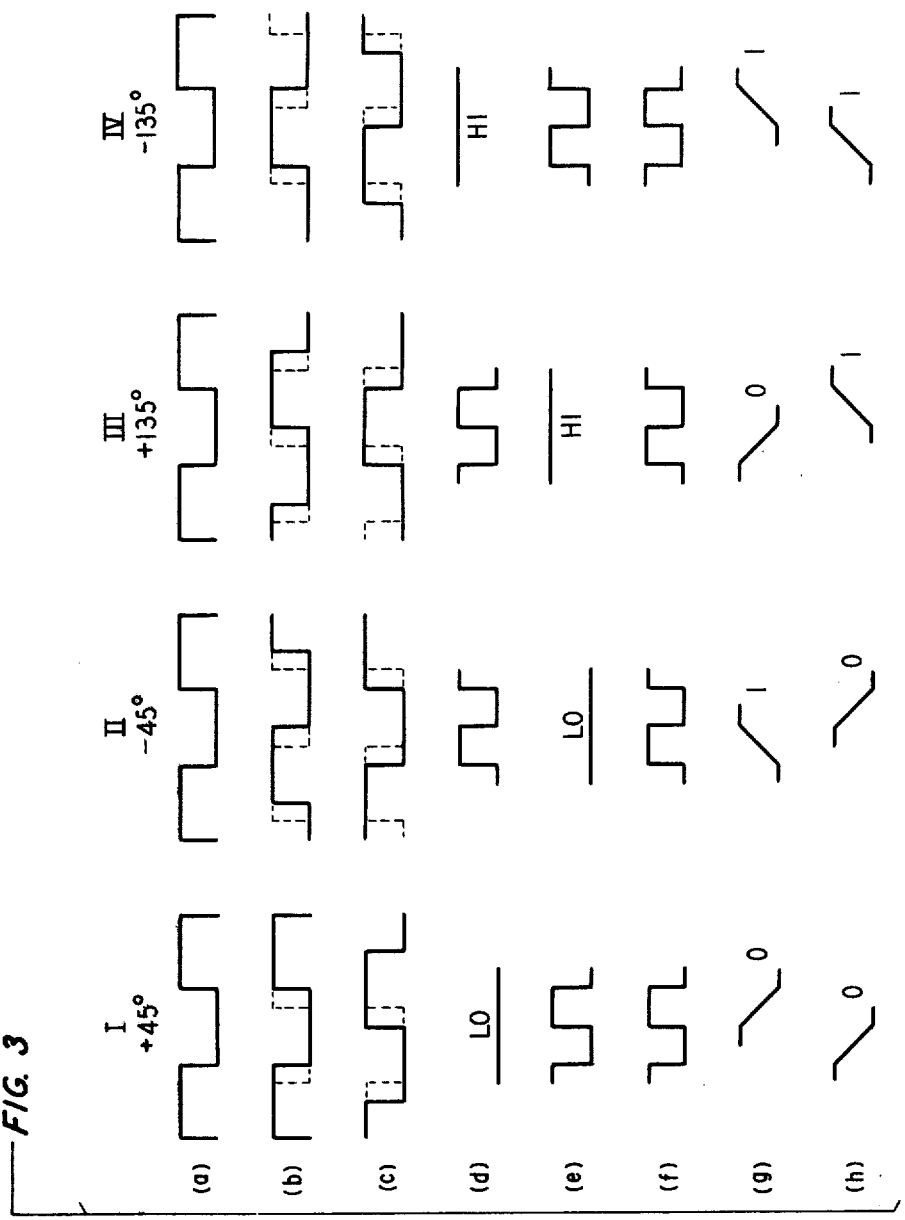
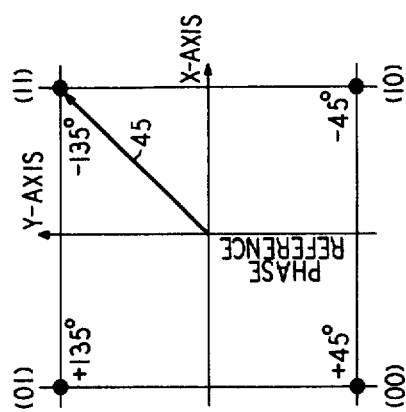

4,019,149

CORRELATIVE DATA DEMODULATOR

FIELD OF THE INVENTION

This invention relates to demodulators in digital data transmission systems, particularly to demodulators for phase-shift keyed data transmission systems.

BACKGROUND OF THE INVENTION

Digital data transmission systems employing differentially encoded phase-shift keying (PSK) are well known in the art. Present day PSK systems generally employ hybrid arrangements of digital and analog circuit components. With the advent of relatively low-cost integrated circuit techniques it has become possible to accomplish modulating and demodulating functions using all-digital techniques with greater reliability and precision than with analog elements known to the prior art.

In differentially encoded PSK data transmission systems, as the name implies, data bits (taken one, two or more at a time) are represented by discrete phase differences measured between succeeding baud or symbol intervals. Decoding is then accomplished broadly by storing or delaying the absolute phases of received signals between baud intervals and subtracting the delayed phase from the present phase. The comparison between succeeding discrete phases can also be accomplished by correlating polarity samples of the received signal with those of a replica of itself delayed by an amount comparable to a baud interval and a fixed carrier phase rotation. The latter correlation detection arrangement has been found to be highly adaptable to digital implementation. However, the signal-processing logic arrangements heretofore proposed have been unduly complex and generally have involved pluralities of reversible counters, auxiliary shift registers and digital logic circuits.

It is accordingly an object of this invention to provide an improved digital demodulator for PSK data signals.

It is another object of this invention to provide an improved demodulator for PSK data signals employing digital correlation techniques.

It is yet another object of this invention to simplify the signal processing required with digital correlation demodulators for PSK data signals.

SUMMARY OF THE INVENTION

In accordance with this invention a demodulator for differentially coherent PSK data signals commprises an amplitude limiter for squaring up and hard-limiting received data signals, a linear sequential memory register for serially storing a plurality of periodic samples of squared data signals during each baud interval, first and second reversible accumulators or counters, a first correlator for stored signal samples spaced by the baud interval increased by a fixed fraction of a cycle of the carrier wave modulated by the data signals for controlling the counting direction of said first counter, a second correlator for stored signal samples spaced by the baud interval decreased by a fixed fraction of a cycle of the carrier wave modulated by the data signals for controlling the counting direction of said second counter, a third correlator for the outputs of said first and second correlators forming an inhibit signal for alternatively enabling and inhibiting said first and second counters, and a first and second bistable circuit responsive at baud intervals to the polarities only of the outputs of the respective first and second counters for detecting the component bits in received data signals. The memory register is symmetrically tapped with respect to its center so that the first and second correlations are not made with respect to any common reference point thereon. The fixed fraction of a cycle of carrier wave delay is a function of the number of possible phase-encoding vectors, e.g., $\pi/4$ radians delay for four-phase encoding.

The first correlations effectively multiply the prior and delayed signals to form products which determine the counting direction or associated reversible counters. The third correlation effectively multiplies the first and second correlations to form an inhibit signal for the reversible counters, thus permitting ternary processing (count up, count down, or inhibit counts). The counters perform the function of integration, i.e., time domain filtering or averaging to suppress noise and higher harmonics created by the multiplication process. The inhibit function of the third correlation transforms the counters into integrators whose output polarities at the end of each counting interval are indicative of the received signal bits. The bistable circuits respond to the polarities of the accumulations at baud sampling times and can be connected to perform a parallel-to-serial conversion. The reversible counters are reset to a reference condition at the end of each baud interval.

Because of the gradual nature of the phase change between successive baud intervals, it is usually not advisable to operate the counters throughout the whole baud interval. The observation of the phase change between baud intervals is best made during the central portion of the baud interval independently of transients encountered at interbaud times. Alternatively information in the central portion of the baud interval can be given more weight by using a higher clock frequency at the central portion than at off-center portions.

It is a feature of this invention that its principle can be implemented with readily available digital components which are compatible with integrated circuit techniques.

BRIEF DESCRIPTION OF THE DRAWING

The objects and features of this invention will become more apparent from a consideration of the following detailed description and the drawing in which:

FIG. 2 is a vector diagram representative of a PSK data signal constellation demodulated by the apparatus of this invention; and FIG. 3 is a waveform diagram useful in explaining the principle of operation of this invention.

DETAILED DESCRIPTION

Figure 1:
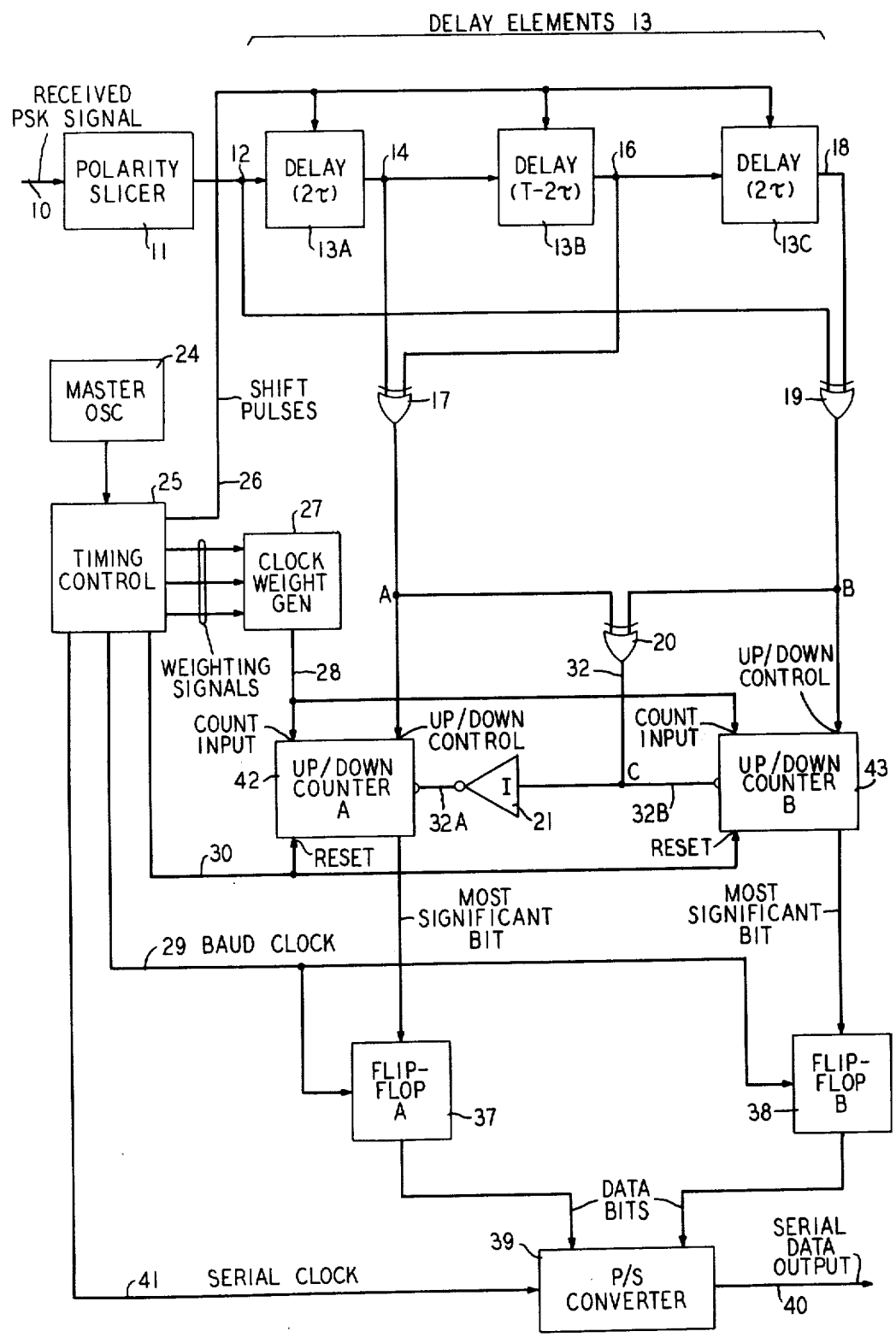
FIG. 1 is a block diagram of a digital demodulator of the correlation detection type for a differentially encoded four-phase PSK data signal in accordance with this invention.

FIG. 2 is a vector diagram of a representative four-phase PSK encoding which is compatible with the correlative demodulator of this invention wherein the dibits 00 and 10 are represented respectively by ±45° of carrier phase change and th dibits 01 and 11, by the respective carrier phases ±135°. This clockwise encoding with respect to the normal phase rotation is convenient because the decoded dibit components are the same as the X and Y coordinates. Any other four-phase encoding can be brought to this state by a matrix transformation. The phase reference between baud intervals is the negative Y-axis. The dibit order is Gray reflected coding in the clockwise direction for minimum error performance. Vector 45 is a typical phase vector whose tip rests during each baud interval on one of the heavy dots centered in each quadrant of the diagram.

The coordinates of the phase change vectors are summarized in the following Table 1.

TABLE I

| Coordinate | Phase Change | | | |
|---|---|---|---|---|
| | +45 Degrees | −45 Degrees | +135 Degrees | −135 Degrees |
| X | −1 | +1 | −1 | +1 |
| Y | −1 | −1 | +1 | +1 |

Decision regions in FIG. 2 are the four quadrants and the polarities alone of the X and Y coordinates are optimum estimates for the binary components of the transmitted dibits.

The principle of correlation detection is implemented by forming the products of pairs of replicas of the received signals which have been sampled at a relatively high rate compared to the carrier frequency. The incremental time delay $2\tau$ is a function of the frequency of the carrier wave and for the differential four-phase system under consideration here equals $$2\tau = \pi/4\omega_c = \frac{1}{8}f_c \tag{1}$$

where $\omega_c$ = radian carrier frequency; and
$f_c$ = carrier frequency in Hz.

The $2\tau$ delay thus equals 45° of carrier wave phase shift. The factor 2 is included to simplify analysis. Because the phase of the received signal should be compared at instants essentially one baud interval apart, it is important that $2\tau$ is relatively small when compared with T, say less than 10 percent of T. In certain systems, up-modulation of the received signal may be necessary to achieve this.

For most practical embodiments it is preferable that baud interval T be related by an integer value to the duration of carrier wave half cycles. Thus, $$t = k\pi/\omega_c = k/2f_c \tag{2}$$

$k$ = an integer (1, 2, 3...$k \neq 0$). In a typical four-phase PSK voiceband data transmission system $k = 3$, $f_c = 1800$ Hz, $I = 1/1200$ second, and $2\tau = T/12$. The principle of this invention is implemented by taking products of replicas of received signals relatively delayed by the baud interval T (or an integral multiple thereof) plus and minus $2\tau$ to obtain first correlation signals A and B. This can be written as $$A = s(t - \tau)s(t - I + \tau) \tag{3}$$

$$B = s(t + \tau)s(t - T - \tau) \tag{4}$$

where
$t$ = time
$T$ = baud interval, and
$s(t)$ = received signal.

According to the above notation a sampling offset $\tau$ is encountered; however, this is usually a very small fraction of T and does not impair performance.

The received signal in differentially encoded PSK system is represented by $$s(t) = \sum_n h(t - nT) \cos(\omega_c t - \theta_n), \tag{5}$$

where
$h(t)$ = impulse response of the transmission channel,
$\omega_c$ = radian carrier frequency, and
$\theta$ = carrier phase difference encoding the data.

When equation (5) is substituted into equations (3) and (4), double frequency terms result. However, these undesired terms are removable by low-pass filtering or by integration. In the specific embodiment integration is performed in up-down, i.e., reversible, counters.

It has been found that hardlimiting the received signal prior to multiplication of delayed replicas, as represented by equations (3) and (4), has no significant effect on demodulation performance. The indicated delays can then be accomplished by digital means, such as shift registers, and the indicated products can be taken with modulo-two adders, e.g., exclusive-OR gates. Furthermore, if the replicas being correlated are symmetrically delayed about a central reference rather than with respect to a common input point, the optimum sampling times for the two counter outputs are the same, which further simplifies implementation.

After digitalization the absolute values of the results of the correlation are of no consequence and only the algebraic signs are significant. The relative times during which signum A and signum B (obtained by sampling the equations (3) and (4) at the same rate the received signal is being advanced through the delay medium) are positive or negative can be preserved in reversible counters for each of signals A and B. Since the correlation process involves multiplication, undesired double-frequency terms are generated. These can be filtered out digitally by applying a weighting function to the counter inputs, effectively allowing them to count only during the center of the baud interval, i.e., for a duration of one double-frequency carrier period, or at least counting faster during this interval to attach more weight to the center of the band.

A third correlation between the results of the first and second correlations provides a C output which is proportional to the sum and difference of the A and B correlations. Thus, $$C = \text{sgn } A \oplus \text{sgn } B, \tag{6}$$

where ⊕ = modulo-two addition operation.

The C output from equation (6) can be used to inhibit and enable the count inputs to the respective reversible counters. The combination of count direction control by the A and B correlations and the inhibit control by the C correlation provides a ternary integration by binary means. Without the inhibit control, the counters would assume three different values as a function of the encoded differential phase shift, but the inhibit feature reduces this to two states only whose optimum estimate is simply obtained by stripping off the sign bit.

A practical circuit for demodulating a differentially coherent four-phase PSK signal according to the correlation detection principle of this invention is shown in FIG. 1. The correlation digital demodulator broadly comprises polarity slicer or limiter 11; delay unit 13; exclusive-OR gates 17, 19 and 20; reversible counters 42 and 43; bistable flip-flops 37 and 38, parallel-to-serial converter 39; and timing circuits. The timing circuits as auxiliary apparatus further comprise master clock oscillator 24, timing control 25, and clock weighting generator 27.

The waveform diagrams of FIG. 3 are useful in explaining the operation of the circuit of FIG. 1.

The received PSK signal is a constant frequency signal exhibiting discrete phase changes between baud centers of ±45° and ±135°. For illustrative purposes there are one and one-half cycles of the carrier wave for each baud interval. The received signal is first applied to polarity slicer 11, which is a form of threshold circuit responsive to polarity changes at zero-crossing transitions only. The output of slicer 11 is a square wave with a phase shift every baud interval. Line (a) of FIG. 3 represents a square wave containing one and one-half cycles of the carrier wave. The waves in FIG. 3 are arrayed in four columns headed I (+45°), II (−45°), III (+135°) and IV (−135°). The waveform on line (a) is the same for each column and represent the one and one-half cycles of carrier wave received in the baud interval just ended.

The received waveform after slicing or squaring is sampled at the high rate of delay element clock signal from clock generator 25 on lead 26 (at least eight times the carrier frequency and preferably on the order of 192 samples per baud). The binary samples are stored in delay elements 13, which are partitioned into three groups 13A, 13B and 13C, having respective delays of $2\tau = \frac{1}{8}f_c$, $T - 2\tau = T - \frac{1}{8}f_c$, and $2\tau = \frac{1}{8}f_c$. $T$ is the baud interval and $f_c$ is the carrier frequency. The fraction $\frac{1}{8}f_c$ equates with 45° of the carrier frequency and corresponds with four-phase PSK modulation. The time delay between input point 12 and output point 18 is therefore 45° in excess of the baud interval T and that between intermediate points 14 and 16 is 45° less than the baud interval. The received signal samples appearing across delay section 13B at junctions 14 and 16 are correlated in exclusive-OR gate 17 to form correlation signal A which is illustratively +1 if the signals are unlike and −1 if the signals are alike.

Similarly, the received signal samples appearing across all three delay sections at junctions 12 and 18 are correlated in exclusive-OR gate 19 to form correlation signal B as either ±1.

Line (b) of FIG. 3 represents the waveform of the present baud interval for each of the discrete phase changes indicated at the top of the column and retarded by 45 additional degrees, as it appears to exclusive-OR gate 17. The broken lines represent the phase change due to signal encoding only. The solid curve includes the additional phase shift due to passing through delay elements 13.

Line (c) of FIG. 3 similarly represents the waveform of the present baud interval advanced by 45°, as it appears to exclusive-OR gate 19. The effect of an apparent negative delay is achieved by the presence of delay section 13A, whereby the 45° retardation of the received signal (for use in forming correlation signal A) is measured from a reference (junction 14) other than that (junction 12) from which correlation signal B is formed. The broken-line curve again represents the phase change due to the signal encoding indexed at the top of the column. The broken-line curves on lines (b) and (c) of FIG. 3 are identical.

Correlation signal A is formed continuously from samples of the received wave appearing at intermediate junctions 14 and 16 having a delay equal to one baud interval less 45° of the carrier wave. The results of this A correlation carried out in exclusive-OR gate 17 are shown on line (d) of FIG. 3, where only the center third of the baud interval is shown because of the weighting employed in the illustrative embodiment. When the waveforms on line (a) and (b) match, that on line (d) is low (column I). Otherwise, the waveform on line (d) is high, as shown in column IV, for example. In columns II and III the waveforms on line (d) are alternately high and low.

Similarly, correlation signal B is formed continuously from samples of the received wave appearing at input junction 12 and output junction 18 having a delay equal to one baud interval plus 45° of the carrier wave. The results of this B correlation carried out in exclusive-OR gate 19 are shown on line (e) of FIG. 4. Only the center third of the baud interval is shown as on line (d).

The respective correlation signals A and B control the counting direction of up-down, i.e., reversible, counters 42 and 43. Illustratively, a high signal allows the counter to count up.

The third correlation signal C is formed by correlating signals A and B in exclusive-OR gate 20. Correlation signal C is shown on line (f) of FIG. 3 as having a transition from high to low or low to high at the center of the baud interval and thus partitions the weighted third in half. The output of exclusive-OR gate 20 is applied over lead 32B to an inhibit input on counter 43. Similarly, the output of exclusive-OR gate 20 is applied over lead 32A after inversion in inverter 21 to an inhibit input on counter 42. Illustratively, when correlation signal C is high, counter B is inhibited and counter A is enabled and vice versa. For counters that do not directly provide an inhibit input, such a feature can be provided in a straightforward way by way of external AND-gates. Lines (g) and (h) of FIG. 4 show the envelope of the respective counter outputs. A net up count decodes and 1 bit of a dibit pair and a net down count, a 0 bit, as is indicated on the waveform diagram. Effectively, the counter states yield the X and Y coordinates of FIG. 2.

The function of the three correlation signals is summarized in the following Table II.

TABLE II

| Sgn A | Sgn B | Sgn C | Ctr A | Ctr B |
|---|---|---|---|---|
| −1 | −1 | −1 | inhibit | countdown |
| −1 | 1 | 1 | countdown | inhibit |
| 1 | −1 | 1 | countup | inhibit |
| 1 | 1 | −1 | inhibit | countup |

The timing arrangement associated with the correlation demodulator is conventional and comprises a master clock oscillator 24, timing control 25 and clock weighting generator 27. Master clock oscillator 24 can advantageously be a crystal-controlled stable oscillator whose output can be counted down to both the baud rate and carrier frequency. For an assumed 1200 bit per second, a four-phase PSK system using a carrier frequency of 1800 Hz master clock generator 24 can operate conveniently at 230.4 kHz or an integral multiple thereof. The delay element clock, which is supplied on lead 26 by control signal generator 25, can be equal or smaller than the frequency of master clock oscillator 24; in the latter case it would be generated via countdown means inside timing control 25. The delay element clock signal on lead 26 controls the advancement of the samples in delay unit 13. With the mentioned frequency of 230.4 kHz, 128 pulses per carrier wave or 192 pulses per baud interval result. A delay equivalent to 45° of the carrier wave would equate to 16 clock pulses and the delay sections 13A, 13B, and 13C would thus consist of 16, 112, and 16 cells.

Clock weighting generator 27 accepts one or more inputs from timing control 25 to yield counting pulses of a desired weighting pattern on lead 28 to clock inputs of counters 42 and 43. Such a weighting might consist of a burst of pulses in the center of the baud interval only, or of a number of bursts with different pulse frequencies. Timing control 25 also supplies baud clock 29 to clock inputs of flip-flops 37 and 38 for sampling the most significant or sign bit of counters 42 and 43 at the end of each counting interval. The counters are reset to their reference setting prior to the next counting interval by way of reset signal 30 which is also generated in timing control 25 at the baud rate. The parallel output bits of flip-flops 37 and 38 are finally applied to parallel-to-serial converter 39 to obtain the desired serial data output 40. Converter 39 is also controlled by bit selector control signal 41 from timing control 25 at the serial bit rate. The signal on lead 41 can preferably be identical to baud clock 29 and consist of a 50% duty cycle square wave.

While this invention has been described by way of a particular embodiment employing a stated baud rate and carrier frequency, it will be apparent to one skilled in the art that its principle is susceptible of modification and extension to other baud rates and carrier frequencies within the spirit and scope of the following claims.

What is claimed is:

1. A demodulator for a four-phase differentially coherent phase-shift-keyed data signal modulating a carrier wave of frequency $f_c$ and having a synchronous baud interval T comprising
   means for delaying received data signals by the baud interval T respectively increased and decreased by the reciprocal of $8f_c$;
   first and second means for correlating in pairs signals obtained from said delaying means respectively delayed by the baud interval T minus, and the baud interval T plus, the reciprocal of $8f_c$ to form first and second correlation signals A and B;
   third means for correlating signals A and B from said first and second correlating means to form a third correlation signal C;
   first and second reversible counting means individually responsive to said first and second signals A and B with respect to counting direction and alternatively to said third signal C with respect to counting inhibition or enablement;
   first and second bistable circuit means responsive to the sign of the accumulated counts of said first and second counting means at the end of each baud interval T; and
   means for resetting each of said first and second counting means to a reference condition at the end of each baud interval T.

2. The demodulator defined in claim 1 in further combination with means for hardlimiting received signals to emphasize polarity and high-speed sampling means for providing a plurality of polarity samples of received signals in each baud interval to said delaying means.

3. The demodulator defined in claim 1 in which said delaying means is a multistage shift register and said first, second and third correlating means are exclusive-OR gates.

4. The demodulator defined in claim 1 in further combination with weighting means to confine the operation of said first and second counting means to a central portion of each baud interval, said portion being essentially equal to an integral multiple of half the period of said carrier wave.

5. The demodulator defined in claim 1 in which a common timing circuit provides a plurality of high-speed advancement pulses to said delaying means and high-speed counting pulses to said first and second counting means and baud-rate pulses for reading-out the states of, and resetting, said counting means at the end of each counting interval.

6. A demodulator for received data signals encoding data elements by phase differences in a carrier wave between successive baud signaling intervals comprising:
   means for hardlimiting said received data signals to display polarity and zero crossings thereof only;
   multistage shift register means for serially storing consecutive samples of signals derived from said hard limiting means extending over more than a baud interval;
   first means for correlating a first pair of samples on said shift register means separated by the baud interval reduced by 45° at the frequency of said carrier wave to form a first correlation signal,
   second means for correlating a second pair of samples on said shift register means separated by the baud interval increased by 45° at the frequency of said carrier wave to form a second correlation signal,
   said first and second pairs of samples being obtained from symmetrically located points with respect to the center of said shift register means,
   third means for correlating said first and second correlation signals to form a third correlation signal,
   first and second reversible counting means responsive as to counting direction respectively to said first and second correlation signals and as to count enablement and inhibition alternatively to said third correlation signal,
   first and second bistable circuit means responsive to the sign of the count standing respectively in said first and second counting means for registering decoded data signals, and
   means for resetting said first and second counting means to a reference state before the start of each baud interval.

7. The demodulator defined in claim 6 in which a high-speed shift generator provides a direct signal to advance said shift register means and operate said first and second counting means and further provides a frequency divided signal to time the duration of baud intervals and to control said bistable circuit means.

8. The demodulator defined in claim 6 in further combination with timing means for selectively weighting the counting rates of said first and second reversible counting means during each baud interval, said timing means providing counting pulses at a higher rate in the center of each baud interval than the average counting rate over the entire baud interval.

* * * * *